(12) United States Patent
Blasius

(10) Patent No.: US 11,542,108 B2
(45) Date of Patent: Jan. 3, 2023

(54) METHOD FOR OPERATING A PALLETIZING PLANT AND PALLETIZING PLANT

(71) Applicant: Koerber Supply Chain Automation Eisenberg GmbH, Eisenberg (DE)

(72) Inventor: Christopher Blasius, Boerrstadt (DE)

(73) Assignee: Koerber Supply Chain Automation Eisenberg GmbH, Eisenberg (DE)

( * ) Notice: Subject to any disclaimer, the term of this patent is extended or adjusted under 35 U.S.C. 154(b) by 0 days.

(21) Appl. No.: 17/197,154

(22) Filed: Mar. 10, 2021

(65) Prior Publication Data

US 2021/0284468 A1    Sep. 16, 2021

Related U.S. Application Data

(60) Provisional application No. 63/145,152, filed on Feb. 3, 2021, provisional application No. 63/144,757, filed on Feb. 2, 2021.

(30) Foreign Application Priority Data

Mar. 10, 2020  (DE) ............................ 102020106424

(51) Int. Cl.
*B65G 57/20*   (2006.01)
*B25J 5/00*    (2006.01)
*B65G 57/03*   (2006.01)

(52) U.S. Cl.
CPC ................ *B65G 57/20* (2013.01); *B25J 5/00* (2013.01); *B65G 57/03* (2013.01); *B65G 2201/0267* (2013.01)

(58) Field of Classification Search
CPC   B65G 57/20; B65G 57/03; B65G 2201/0267; B25J 5/00
See application file for complete search history.

(56) References Cited

U.S. PATENT DOCUMENTS 9,731,916 B2    8/2017  Kollmuss et al.
9,758,321 B2 *  9/2017  Paulussen .............. B65G 61/00
(Continued)

FOREIGN PATENT DOCUMENTS

DE       19943800       3/2001
DE     102006057758     6/2008
(Continued)

OTHER PUBLICATIONS

Extended European Search Report for 21161556.2, dated Jul. 13, 2021, 10 pages.

*Primary Examiner* — Lynn E Schwenning
(74) *Attorney, Agent, or Firm* — Dority & Manning, P.A.

(57) ABSTRACT

The invention relates to a method for operating a palletizing plant (5) which comprises a palletizing apparatus (10) for forming a layer stack (100) and at least one driverless transport vehicle (40) for transporting the layer stack (100). In the method, the driverless transport vehicle (40) is moved to a palletizing location (41) close to the palletizing apparatus (10) and a layer stack (100) is formed on the driverless transport vehicle (40). The driverless transport vehicle (40) remains at the palletizing location (41) during the formation of the layer stack (100). The invention also relates to a palletizing plant (5) which is set up to carry out the method according to the invention.

7 Claims, 2 Drawing Sheets

(56) References Cited

U.S. PATENT DOCUMENTS

| | | | |
|---|---|---|---|
| 9,908,721 B2 | 3/2018 | Petrovic | |
| 10,442,638 B2 | 10/2019 | Kollmuss et al. | |
| 2008/0131255 A1* | 6/2008 | Hessler | B65B 35/50 |
| | | | 901/14 |

FOREIGN PATENT DOCUMENTS

| | | | | |
|---|---|---|---|---|
| DE | 102011088849 | | 6/2013 | |
| DE | 102012203575 | * | 9/2013 | ............. B65G 35/00 |
| DE | 102014226499 | * | 6/2016 | ............. B65G 47/52 |
| DE | 102015206124 | | 10/2016 | |
| EP | 1151944 | | 11/2001 | |
| EP | 2547612 | | 1/2013 | |

* cited by examiner

METHOD FOR OPERATING A PALLETIZING PLANT AND PALLETIZING PLANT

The invention relates to a method for operating a palletizing plant which comprises a palletizing apparatus for forming a layer stack and at least one driverless transport vehicle for transporting the layer stack, wherein the driverless transport vehicle is moved to a palletizing location close to the palletizing apparatus and a layer stack is formed on the driverless transport vehicle. The invention also relates to a palletizing plant for carrying out the method according to the invention.

PRIOR ART

A generic palletizing plant which is known through use comprises a palletizing apparatus and a plurality of driverless transport vehicles. By means of such a palletizing plant, individual articles can be palletized and combined and provided for onward transport, for example by means of a truck.

The palletizing apparatus is used to arrange articles, in particular piece goods or containers for transport on transport aids, in particular pallets. To this end, the articles are, for example, first of all combined into individual article layers and then set down in layers so as to form a layer stack on the transport aid. In this case, first of all a first article layer of a layer stack is set down directly on the transport aid and subsequently further article layers are set down on the first article layer and the further article layers.

Palletizing apparatuses and methods for palletizing article layers are known for example from the documents DE 199 43 800 A1, DE 10 2015 206 124 A1, DE 10 2014 223 319 A1, EP 2 610 197 A1, EP 2 881 347 B1, DE 10 2011 088 849 A1 and EP 2 547 612 B1.

The driverless transport vehicles are used to bring empty transport aids to a palletizing location close to the palletizing apparatus and subsequently to take the transport aids with the layer stacks located thereon away from the palletizing location, for example to a removal location, and provide them there for onward transport.

The document DE 10 2006 057 758 B4 discloses a method and an apparatus for order-picking goods. In that case, first of all an autonomous, driverless transport vehicle is loaded with products. The loaded transport vehicle then travels to a palletizing station with a palletizing robot. The palletizing robot removes the goods from the transport vehicle and sets the goods down on a transport pallet.

The document DE 10 2012 203 575 A1 discloses a driverless transport system of a packaging plant and a method for the control thereof. In that case, the driverless transport system comprises a plurality of transport vehicles for transporting pallets. Such a transport vehicle brings in each case an empty pallet to a palletizer and takes a full pallet away from the palletizer.

The document DE 601 111 19 T2 discloses a palletizing installation having an apparatus for forming a row of products. In that case, a pallet on which layers of products are deposited can be transported by an automatically guided vehicle (AGV).

Increasingly, use is also made of palletless packaging. In this case, the layer stacks for transport are formed either on what is known as a slip sheet or entirely without a transport aid. As a result, the loading capacity of warehouses and trucks can be increased and the use of resources for loading aids is reduced. Within palletization, use is sometimes made in this case of palletizing aids, which simplify palletization. The layer stacks are removed from this palletizing aid again after palletization. The palletizing aid can either, like the transport aid, be connected detachably to the driverless transport system or be a constituent part thereof.

Problem

The object of the present invention is to improve a palletizing plant of the type mentioned at the beginning and a method for operating such a palletizing plant. In particular, the object of the invention is to increase the degree of automation and the flexibility of such a palletizing plant, to reduce the necessary space requirement and to increase the speed during palletization.

Solution

This problem is solved by a method for operating a palletizing plant having the features of claim 1. Advantageous configurations and developments of the invention are the subject matter of the dependent claims. The problem is also solved by a palletizing apparatus having the features of claim 9. Advantageous configurations and developments of the invention are the subject matter of the dependent claims.

A generic palletizing plant comprises a palletizing apparatus for forming a layer stack and at least one driverless transport vehicle for transporting the layer stack. According to a generic method for operating such a palletizing plant, the driverless transport vehicle is first of all moved to a palletizing location close to the palletizing apparatus. There, a layer stack is formed on the driverless transport vehicle. The palletizing location is located so close to the palletizing apparatus that the palletizing apparatus, in order to form the layer stack, can set down article layers on the driverless transport vehicle.

As a result of the use of driverless transport vehicles, the degree of automation and the flexibility of the palletizing plant are significantly increased. Conveyors for transporting transport aids to the palletizing location, which have a comparatively high space requirement, are not necessary. Adaptations to different types of transport aids or additional palletizing locations are also easy to implement. In particular, differently configured transport aids, for example customer-specific pallets with different dimensions, can be received and transported easily by driverless transport vehicles.

A driverless transport vehicle can drive up to any number of different palletizing locations and is not bound to particular routes. A driverless transport vehicle can drive up to a palletizing location from different directions, if necessary turn at the palletizing location, and travel away from the palletizing location in different directions.

According to the invention, the driverless transport vehicle remains close to the palletizing apparatus during the formation of the layer stack at the palletizing location. The layer stack is thus set down on the driverless transport vehicle. The driverless transport vehicle leaves the palletizing location only when the layer stack has been fully formed.

Since the driverless transport vehicle remains at the palletizing location during the formation of the layer stack, it is not necessary to set down an empty transport aid or to pick up the transport aid again with the layer stack formed thereon. The palletizing apparatus can, at least approximately, continue to work continuously. A waiting time during the exchange of transport aids is not necessary or is reduced to a minimum. As a result, the speed during operation of a palletizing plant is advantageously increased.

According to one advantageous configuration of the invention, a transport aid is arranged on the driverless transport vehicle. The layer stack is in this case formed on the transport aid, which is located on the driverless transport vehicle. The layer stack is thus formed with interposition of the transport aid on the driverless transport vehicle.

When the driverless transport vehicle is located at the palletizing location, the transport aid can be centred and/or oriented such that the palletizing apparatus can set down article layers on the transport aid. Similarly, the entire driverless transport vehicle can be centred and/or oriented at the palletizing location such that the palletizing apparatus can set down article layers on the transport aid.

According to another advantageous configuration of the invention, the layer stack is formed directly on the driverless transport vehicle. It is thus not necessary to interpose a transport aid.

If a slip sheet is used, this can be placed on the transport aid or the empty transport vehicle directly at the palletizing location, or the transport aid or the transport vehicle can be equipped with a slip sheet away from the palletizing location in order to increase the speed of the palletizing operation.

Preferably, in order to form the layer stack, first of all a first article layer is set down on the driverless transport vehicle by the palletizing apparatus. This one article layer already forms a layer stack. Subsequently, at least one further article layer is set down on the first article layer. Further article layers can be set down on the layer stack already formed, with the result that the layer stack becomes increasingly large and high. Thus, the formed layer stack preferably, but not necessarily, comprises a plurality of article layers.

If the output of the upstream machines is very low, relatively long stoppages of the palletizing apparatus can occur. In this case, the capacity of the plant can be increased in that a plurality of driverless transport vehicles are loaded in layers. To this end, first of all one vehicle is loaded for as long as articles are available. Subsequently, it travels to a standby position and another vehicle is loaded with its articles, then the next one and so on until at least one layer of the first article is present in an upstream store again. This process is repeated until the desired pallet height has been reached. The respective layer stacks together with the transport aid remain on their vehicle the entire time. As a result, the changing time between two products is minimized while, at the same time, the necessary buffer length is minimized.

According to one advantageous configuration of the invention, an energy store of the driverless transport vehicle is charged while the driverless transport vehicle is located at the palletizing location. The energy store of the driverless transport vehicle is thus charged in the time in which the layer stack is formed, while the driverless transport vehicle is at a standstill anyway. As a result, time-consuming charging of the energy store at a different location at a different time is avoided. As a result, the speed and output during operation of the palletizing plant are increased further.

According to one preferred development of the invention, the driverless transport vehicle is moved away from the palletizing location close to the palletizing apparatus and to a removal location after the layer stack has been formed. At the removal location, the layer stack is then removed from the driverless transport vehicle and provided for onward transport.

According to one advantageous configuration of the invention, at said removal location, the layer stack is removed together with the transport aid from the driverless transport vehicle. In this case, the driverless transport vehicle is subsequently provided with a further transport aid that is still empty.

In the case of palletless palletization, it may be advantageous to form the layer stacks on the transport vehicle on a palletizing aid that is embodied in a similar manner to said transport aid (pallet). As a result, the transport vehicle requires only one receptacle for both applications. At said removal location, the layer stack, optionally together with a slip sheet, is removed from the palletizing aid. In this case, the palletizing aid remains on the transport vehicle.

According to one advantageous development of the invention, after the driverless transport vehicle has been moved away from the palletizing location, a further driverless transport vehicle is moved from a standby location to the palletizing location. The standby location is located preferably in the immediate vicinity of the palletizing location, such that the further driverless transport vehicle can reach the palletizing location in a short time. Subsequently, a further layer stack is formed on the further driverless transport vehicle. As a result, the speed during operation of a palletizing plant is increased further.

According to one advantageous configuration of the invention, an energy store of the further driverless transport vehicle is charged while the further driverless transport vehicle is located at the standby location. The energy store of the further driverless transport vehicle is thus charged while the driverless transport vehicle is waiting and is therefore at a standstill anyway. As a result of this, too, time-consuming charging of the energy store at a different location at a different time is avoided. As a result, the speed during operation of the palletizing plant is increased further.

A generic palletizing plant comprises, as mentioned above, a palletizing apparatus for forming a layer stack and at least one driverless transport vehicle for transporting the layer stack.

In this case, the palletizing plant according to the invention is set up to carry out the method according to the invention. During operation of the palletizing plant, the driverless transport vehicle, usually with a transport aid, is thus first of all moved to a palletizing location close to the palletizing apparatus, and a layer stack is formed on the driverless transport vehicle there. In this case, the driverless transport vehicle, optionally with the transport aid, remains at the palletizing location during the formation of the layer stack, and the layer stack is set down on the driverless transport vehicle. The driverless transport vehicle leaves the palletizing location only when the layer stack has been fully formed.

According to one advantageous configuration of the invention, close to the palletizing apparatus, a palletizing location is thus provided, at which the layer stack is formed. In this case, a device for charging an energy store of the driverless transport vehicle, in particular in the form of a charger with a corresponding energy transfer device, is provided at the palletizing location. The energy transfer device can be for example a plug connection or a contactless inductive system.

Said palletizing location is thus located so close to the palletizing apparatus that the palletizing apparatus, in order to form the layer stack, can set down article layers on the driverless transport vehicle.

According to one advantageous configuration of the invention, a standby location is furthermore also provided, at which a further driverless transport vehicle, optionally with a transport aid, can wait. In this case, a device for charging an energy store of the driverless transport vehicle, in particular in the form of a charger with a corresponding energy transfer device, is provided at the standby location. The energy transfer device can be for example a plug connection or a contactless inductive system.

Said standby location is located preferably in the immediate vicinity of the palletizing location, such that the further driverless transport vehicle can reach the palletizing location in a short time.

Preferably, a removal location is also provided. At the removal location, the layer stack can be removed from the driverless transport vehicle and provided for onward transport, for example by means of a truck.

The driverless transport vehicle can be configured such that a transport aid or a palletizing aid can be set down on the driverless transport vehicle. The transport aid, and the palletizing aid, on which the layer stack is then formed, are thus connected detachably to the driverless transport vehicle.

The layer stack can then be removed, together with the transport aid, from the driverless transport vehicle at the removal location. The driverless transport vehicle can subsequently be provided with a further transport aid that is still empty.

The driverless transport vehicle can have a load handling device, for example in the form of a roller conveyor, on which a transport aid can be positioned.

The transport aid can be configured in the form of a pallet. However, other configurations, for example in the form of corrugated board, a wooden board, plastics tray or the like are also conceivable.

The driverless transport vehicle can also have a positioning face, which itself serves as a palletizing aid and on which the layer stack is formed. In this case, the palletizing aid is connected non-detachably to the driverless transport vehicle.

The layer stack can then be removed from the palletizing aid at the removal location. The palletizing aid itself remains in this case on the driverless transport vehicle.

FIGURES AND EMBODIMENTS OF THE INVENTION

The invention is explained in more detail in the following text on the basis of an advantageous exemplary embodiment illustrated in the figures. The invention is not limited to this exemplary embodiment, however. The figures illustrate the subject matter of the invention only schematically. In the figures.

Figure 1:
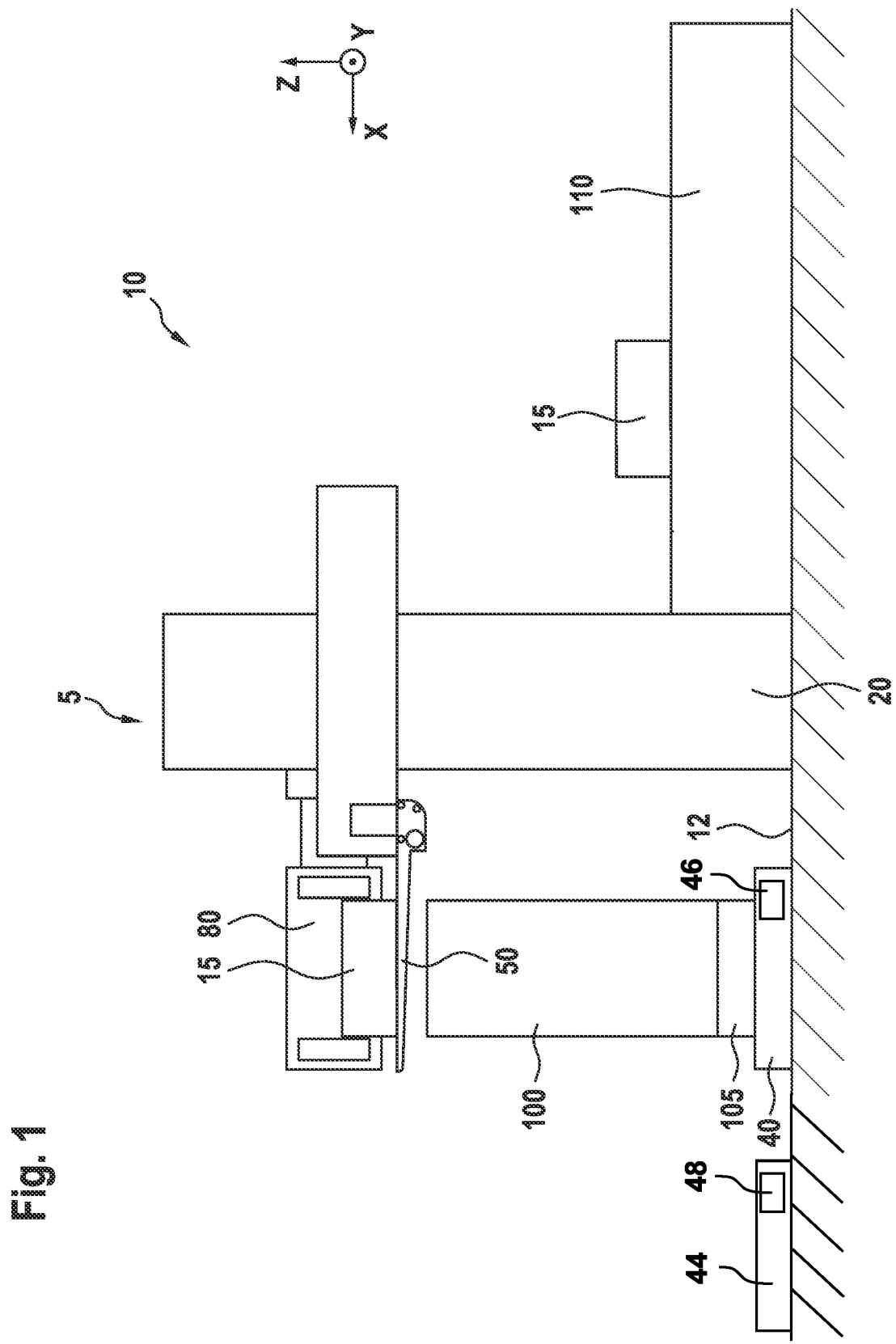
FIG. 1 shows a schematic front view of a palletizing plant.

FIG. 1 shows a schematic front view of a palletizing plant 5. The palletizing plant 5 comprises a palletizing apparatus 10, which serves to form a layer stack 100 on a transport aid 105. The palletizing plant 5 furthermore comprises a plurality of driverless transport vehicles 40, 44, wherein only two such driverless transport vehicles 40, 44 are illustrated in the illustration shown. The driverless transport vehicles 40, 44 serve to supply the transport aids 105 to the palletizing apparatus 10 and to take away transport aids 105 with layer stacks 100 formed thereon.

The palletizing apparatus 10 stands on a floor 12. The palletizing apparatus 10 comprises a lifting apparatus 20, which extends substantially in a vertical direction Z away from the floor 12. The lifting apparatus 20 is configured in the present case in the form of a column. The vertical direction Z extends at right angles to the floor 12 and at right angles to a longitudinal direction X. A transverse direction Y extends at right angles to the vertical direction Z and at right angles to the longitudinal direction X. The longitudinal direction X and the transverse direction Y thus extend parallel to the floor 12.

The palletizing apparatus 10 comprises a set-down apparatus 50, which is arranged on the lifting apparatus 20. The set-down apparatus 50 is movable in the vertical direction Z relative to the lifting apparatus 20. The set-down apparatus 50 is additionally movable in the longitudinal direction X between a first longitudinal position and a second longitudinal position relative to the lifting apparatus 20. The set-down apparatus 50 is configured advantageously in the form of a set-down belt and comprises a circulating conveyor belt, which defines a transport face for transporting an article layer 15 in the longitudinal direction X.

The palletizing apparatus 10 also comprises a compressing apparatus 80, which is arranged on the lifting apparatus 20. The compressing apparatus 80 is movable in the vertical direction Z relative to the lifting apparatus 20. The compressing apparatus 80 serves to orient an article layer 15 that is located on the transport face of the set-down apparatus 50, and/or to subsequently orient the layer stack 100 formed.

The palletizing plant 5 furthermore comprises a feed apparatus 110. By means of the feed apparatus 110, article layers 15 are fed to the palletizing apparatus 10. In this case, first of all a plurality of individual products or piece goods are combined by the feed apparatus 110 into a stackable article layer 15, and the article layer 15 thus produced is subsequently transported further in the longitudinal direction X to the palletizing apparatus 10. It is also conceivable for a stackable article layer 15 to contain only one product or piece good.

In order to form a layer stack 100 on the transport aid 105, first of all an article layer 15 is transferred from the feed apparatus 110 onto the set-down apparatus 50, which is located in this case in the first longitudinal position. Subsequently, the set-down apparatus 50 is moved in the vertical direction Z to the height of the layer stack 100 that has already been formed. Subsequently, the set-down apparatus 50 is moved in the longitudinal direction X into the second longitudinal position. Thereupon, the compressing apparatus 80 is lowered in the vertical direction Z such that the article layer 15 located on the transport face of the set-down apparatus 50 is located between stops of the compressing apparatus 80. The situation described here is illustrated in FIG. 1.

Provided on the floor 12, beneath the compressing apparatus 80 in the vertical direction Z, is a palletizing location 41. Located at the palletizing location 41 is a driverless transport vehicle 40. The driverless transport vehicle 40 carries a transport aid 105, for example in the form of a pallet, on which a layer stack 100 is already located. The layer stack 100 comprises in this case a plurality of article layers 15 stacked on top of one another.

When the set-down apparatus 50 is moved in the longitudinal direction X into the first longitudinal position, the article layer 15 that is located between the stops of the compressing apparatus 80 is, as a result, set down on the layer stack 100 by the palletizing apparatus 10. The layer stack 100 that is located on the transport aid 105 subsequently comprises a further article layer 15.

Figure 2:
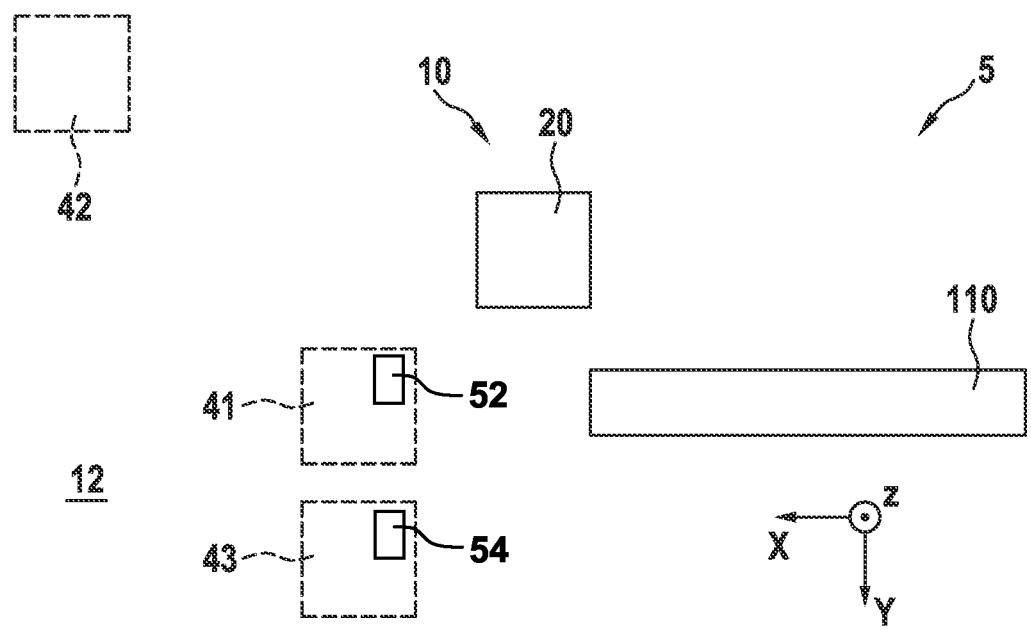
FIG. 2 shows a plan view of the palletizing plant from FIG. 1.

FIG. 2 shows a plan view of the palletizing plant 5 illustrated in FIG. 1. In this case, the set-down apparatus 50 and the compressing apparatus 80 are not illustrated. Article layers 15 are not illustrated either. Furthermore, a driverless transport vehicle 40 and a transport aid 105 are not illustrated.

The abovementioned palletizing location 41 is located close to the palletizing apparatus 10. This means that the palletizing location 41 is located at a place where the palletizing apparatus 10, in order to form the layer stack 100, can set down article layers 15 on the transport aid 105 that is located at the palletizing location 41. The palletizing location 41 is located on the floor 12 and is arranged in a manner offset in the longitudinal direction X and in the transverse direction Y with respect to the lifting apparatus 20.

The palletizing location 41 is located in a manner offset in the longitudinal direction X with respect to the feed apparatus 110 in the present case. In the transverse direction Y, the palletizing location 41 is at least approximately aligned with the feed apparatus 110. An article layer 15 is thus transported only in the longitudinal direction X and in the vertical direction Z from the feed apparatus 110 to the transport aid 105 or the layer stack 100. It is therefore not necessary for the article layer 15 to be transported in the transverse direction Y by the palletizing apparatus 10.

Provided at the palletizing location 41 is a device 52 for charging an energy store of a driverless transport vehicle 40, or 44 for example. Said device is configured in the form of a charger with a corresponding energy transfer device.

A standby location 43 is also provided, which is located preferably in the immediate vicinity of the palletizing location 41. The standby location 43 is located on the floor 12 and is arranged in the present case in a manner offset in the transverse direction Y with respect to the palletizing location 41. In the longitudinal direction X the palletizing location 41 is aligned with the standby location 43. The standby location 43 can, however, also be arranged at other points, for example in a manner offset in the longitudinal direction X with respect to the palletizing location 41.

Also provided at the standby location 43 is a device 54 for charging an energy store of a driverless transport vehicle 40, or 44 for example. Said device is likewise configured in the form of a charger with a corresponding energy transfer device.

During operation of the palletizing plant 5, a first driverless transport vehicle 40 is moved, if necessary with a transport aid 105, to the palletizing location 41. A layer stack 100 is then formed on the transport aid 105. During the formation of the layer stack 100, the first driverless transport vehicle 40 remains at the palletizing location 41. In the process, the energy store 46 of the first driverless transport vehicle 40 is charged. A further driverless transport vehicle 44 with a further transport aid 105 (not shown) is, in the meantime, located at the standby location 43. In the process, the energy store 48 of the further driverless transport vehicle 44 is also charged.

Once the layer stack 100 has been fully formed on the transport aid 105, the first driverless transport vehicle 40 is moved away from the palletizing location 41 and to a removal location 42. At the removal location 42, the layer stack 100 is then removed, together with the transport aid 105, from the first driverless transport vehicle 40 and provided for onward transport, for example by means of a truck.

Immediately after the first driverless transport vehicle 40 has left the palletizing location 41, the further driverless transport vehicle 44 is moved with the further transport aid 105 from the standby location 43 to the palletizing location 41. Then, a further layer stack 100 is formed on the further transport aid 105.

Immediately after the further driverless transport vehicle 44 has left the standby location 43, another driverless transport vehicle is moved with a further transport aid 105 to the standby location 43.

The invention is not limited to the exemplary embodiments described here and the aspects highlighted therein. Rather, a large number of modifications that lie within the capabilities of a person skilled in the art are possible within the scope defined by the claims.

LIST OF REFERENCE SIGNS

5 Palletizing plant
10 Palletizing apparatus
12 Floor
15 Article layer
20 Lifting apparatus
40 First driverless transport vehicle
41 Palletizing location
42 Removal location
43 Standby location
44 Further driverless transport vehicle
46 Energy store of the first driverless transport vehicle
48 Energy store of the further driverless transport vehicle
50 Set-down apparatus
52 Device for charging an energy store at the palletizing location
54 Device for charging an energy store at the standby location
80 Compressing apparatus
100 Layer stack
105 Transport aid
110 Feed apparatus
X Longitudinal direction
Y Transverse direction
Z Vertical direction

The invention claimed is:

1. A method for operating a palletizing plant comprising: a palletizing apparatus for forming a plurality of layer stacks and a plurality of driverless transport vehicles for transporting the layer stack, the method comprising:
moving a first driverless transport vehicle of the plurality of driverless transport vehicles to a palletizing location close to the palletizing apparatus;
forming one or a few layers of a layer stack on the first driverless transport vehicle, wherein the layer stack is formed on a transport aid arranged on the first driverless transport vehicle or the layer stack is formed directly on the first driverless transport vehicle;
wherein the first driverless transport vehicle remains at the palletizing location during the formation of one or more layers of the layer stack; charging an energy store of the first driverless transport vehicle while the first driverless transport vehicle is located at the palletizing location; moving the first driverless transport vehicle away from the palletizing location to a removal location after the layer stack has been formed;
wherein, at the removal location, the layer stack is removed from the first driverless transport vehicle or is removed with the transport aid from the first driverless transport vehicle; and
wherein the plurality of layer stacks are formed continuously on the plurality of driverless transport vehicles, by a method (I) wherein one or a few layers are deposited on the first driverless transport vehicle, moving the first driverless transport vehicle into a standby location, moving a further driverless transport vehicle from the plurality of driverless transport vehicles to the palletizing location, and depositing one or a few layers on the further driverless transport vehicle, moving the further driverless transport vehicle to the standby location, and repeating the method (I), until one of the layer stacks has reached a desired height.

2. The method according to claim 1, wherein the further driverless transport vehicle is moved from the standby location to the palletizing location and the layer stack is formed on the further driverless transport vehicle.

3. The method according to claim 2, wherein an energy store of the further driverless transport vehicle is charged while the further driverless transport vehicle is located at the standby location.

4. The method according to claim 1, wherein the method (I) further comprises more than two driverless transport vehicles from the plurality of driverless transport vehicles.

5. The method according to claim 1, wherein the palletizing plant comprises:

the palletizing apparatus and the plurality of driverless transport vehicles;

the palletizing location, the palletizing location close to the palletizing apparatus;

the first driverless transport vehicle of the plurality of driverless transport vehicles, the first driverless transport vehicle comprising the energy store of the first driverless transport vehicle, the first driverless transport vehicle having the transport aid arranged on the first driverless transport vehicle;

the standby location for the plurality of driverless transport vehicles; and the removal location for the removal of a plurality of layer stacks from the plurality of driverless transport vehicles.

6. The method according to claim 5, wherein a device for charging the energy store of the first driverless transport vehicle is provided at the palletizing location.

7. The method according to claim 5, wherein a device for charging the energy store of the first driverless transport vehicle is provided at the standby location.

* * * * *